United States Patent
Smyth

(10) Patent No.: US 6,670,947 B2
(45) Date of Patent: Dec. 30, 2003

(54) SO3 INPUT DEVICE

(76) Inventor: Robert William Smyth, 57 Cedar Grove Rd., Toms River, NJ (US) 08753

( * ) Notice: Subject to any disclaimer, the term of this patent is extended or adjusted under 35 U.S.C. 154(b) by 257 days.

(21) Appl. No.: 10/007,424

(22) Filed: Oct. 22, 2001

(65) Prior Publication Data

US 2003/0076304 A1 Apr. 24, 2003

(51) Int. Cl.[7] .................................................. G09G 5/08
(52) U.S. Cl. ........................ 345/167; 345/156; 345/157
(58) Field of Search ............................... 345/156–158, 345/162–167; 341/20–22, 31, 32

(56) References Cited

U.S. PATENT DOCUMENTS

| | | | | |
|---|---|---|---|---|
| 4,811,608 A | * | 3/1989 | Hilton | 73/862.04 |
| 5,019,809 A | * | 5/1991 | Chen | 340/815.31 |
| 5,854,623 A | * | 12/1998 | Bullister | 345/167 |
| 5,889,505 A | * | 3/1999 | Toyama et al. | 345/156 |
| 5,923,318 A | * | 7/1999 | Zhai et al. | 345/157 |
| 6,239,785 B1 | * | 5/2001 | Wallace et al. | 345/156 |
| 6,246,391 B1 | * | 6/2001 | Ong | 345/156 |
| 6,466,198 B1 | * | 10/2002 | Feinstein | 345/158 |

* cited by examiner

Primary Examiner—Amare Mengistu
Assistant Examiner—Tommy Sheng

(57) ABSTRACT

An apparatus, method and algorithm for the economical, intuitive rotational control of a three dimensional object displayed on a computer monitor. The computer input device consists of a tracked ball, with a directed source emanating from it, that is housed in an enclosure which allows for the free rotation of the ball. The ball sits on a bearing within a base equipped with an array of sensors. Activated sensors are grouped in such a way that the positions of the detected sources can be determined. A 3×3 orientation matrix is then computed to allow applications programs to present a graphical object in the same orientation as the orientation that the user has given to the ball in the input device.

6 Claims, 3 Drawing Sheets

SO3 INPUT DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to the field of computer input devices. In particular, this invention includes an apparatus, method and algorithm for the intuitive rotational control of three dimensional graphical objects displayed on a monitor.

Various computer input devices have been designed to allow user manipulation of graphical pointers, cursors or objects on a computer screen in two dimensions. Most notably, these include the common computer mouse, trackball and joystick. There are also various computer input devices that have been designed to allow for user manipulation of graphical objects in three-dimensions. However, many of the various devices designed to date are complicated to use. For example one such device is a six-degree-of-freedom (6 DoF) joystick, such as the Spaceball.™., described in U.S. Pat. No. 4,811,608 to John A. Hilton, issued (Mar. 14, 1989). However, the six degrees of freedom provided do not directly match position and orientation. The correlations of torque and force quantities to rotations and translations is reputedly difficult and unnatural to learn.

The existing devices generally involve using various buttons or wheels and require good coordination for proper use. For instance, a sequence of signals from a 2-D input device may be used to simulate a signal from a virtual 3-D trackball such as described in U.S. Pat. No. 5,019,809 to Michael Chen (May 28, 1991). The user must manipulate a virtual trackball on screen which separates the user from manipulating the intended object and tends to decrease accuracy. Other methods require awkward usage of 2-D input devices. Moreover, many of the devices are so complex, that their manufacture is uneconomical. A more intuitive device is always desirable to be more user-friendly and a more economical device is desirable as well.

A method is described in U.S. Pat. No. 5,854,623 to Edward Bullister (Dec. 29, 1998) which uses a ball whose surface is patterned with reflective Platonic solid tilings and intends to provide a more direct correspondence between rotations of the trackbar and the object. Drawbacks in this design include the need for pattern recognition algorithms and the need to introduce various additional complexities if absolute orientations are desired.

The current invention provides an intuitive, easy to use, freely manipulable computer input device for the three dimensional rotational control of a graphical object using simple, low cost materials and very simple interpretation algorithms which may be used to yield absolute measurements of orientation.

BRIEF SUMMARY OF THE INVENTION

It is the object of this invention to provide an intuitive, easy to use, freely manipulable computer input device for the three dimensional rotational control of a graphical object using simple, low cost materials and very simple interpretation algorithms which may be used to yield absolute measurements of orientation. The apparatus and method includes freely rotating what can be thought of as a large trackball. Unlike an ordinary mouse-like trackball, the SO3 (special orthogonal group in 3 dimensions) device tracks rotations about all axes through the center of the ball. One of the advantages of this invention, is the very easy, intuitive control of graphical objects. There is a natural correlation between the manipulation of the device by the user and the movement of the graphical object under the control of the device. Simply put, an applications program can use the information provided by the device to rotate an object displayed on the screen the very same way that the user is rotating the ball in the device. There is no complicated coordination of buttons or simulated motion. The invention consists of hardware and the method of use of the device and software algorithms used to interpret the data read from the device. Much of the ease of operation of the device is due to the development of the proper algorithm for interpreting the signals from the input device. The current device could be useful for computer-aided design, molecular modeling, rational drug discovery, virtual reality, and educational and recreational applications which involve 3D image manipulations.

DETAILED DESCRIPTION OF THE INVENTION

Hardware Design

Figure 1:
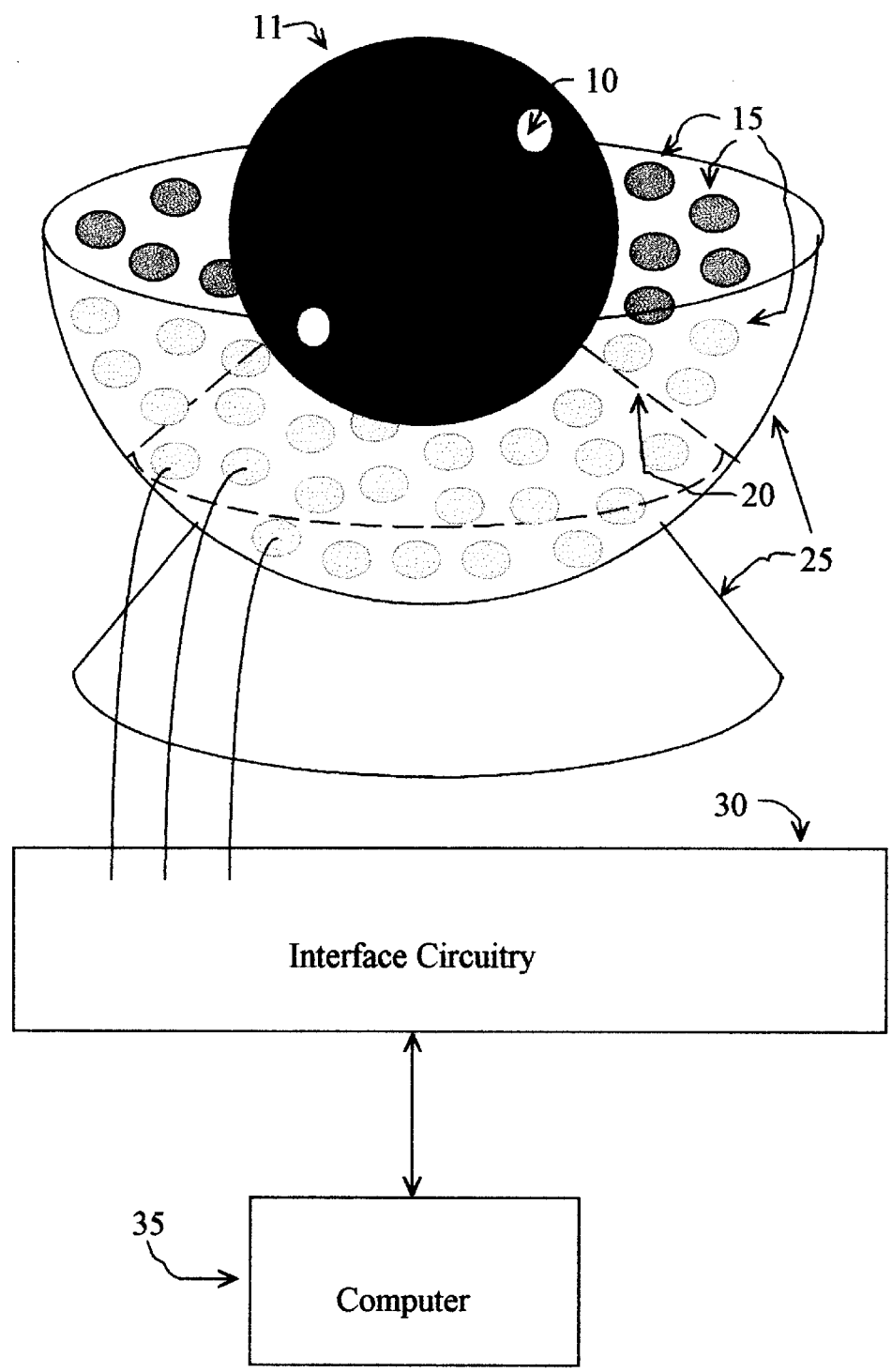
FIG. 1: Overview of an input device apparatus in accordance with the present invention.

FIG. 1 illustrates a possible configuration of the essential device components in one embodiment of the device. The enclosure is not depicted.

The device consists of:

- a ball 11 with a collection of "directed sources" 10 inside (to be explained below)
- a bearing 20 on which the ball 11 rests, so that the ball 11 may be rotated easily in an arbitrary fashion around any axis through the ball's center
- a base 25 which holds the bearing 20 as well as an array(s) of sensors 15 capable of responding to the "sources" 10 inside the ball 11, each sensor in the array need only have two possible output states ("on" or "off")
- an enclosure to isolate the sensors from the environment outside the device (the enclosure must expose enough of the ball 11 so that the ball 11 may be freely and easily rotated by the user), and
- interface circuitry 30 to allow a general purpose computer 35 or specialized electronic processor to read the state of each sensor (that is, whether the response of each sensor to the "directed sources" 10 is above or below a certain threshold).

The "directed sources" 10 may be energy beams or fields which emanate from a few fixed locations or distinguished points 10 on the ball 11. These special locations will be referred to as source points 10. In one embodiment, a light source(s) is placed in the ball 11. If the ball 11 is opaque and small holes are drilled in the ball 11, light will emanate from the holes. (The different holes should be considered different source points 10, even if the light streaming through these holes comes from a single incandescent bulb in the center of the ball 11.) In this embodiment, the sensor array(s) 15 could be created using photoresistors. In a preferable embodiment the sources will not require an energy supply, for example permanent magnets may be placed inside the ball 11 together with flux concentrators designed to intensify the perpendicular magnetic field strength at distinguished points 10 on the surface of the ball 11. In this preferred embodiment, the sensor array(s) 15 could be created using Hall effect sensors. The size and position of the array of sensors 15, and the number and positions of the source points 10 on the ball 11 must be chosen so that, for any orientation of the ball 11, at least two nonantipodal source points 10 on the ball 11 are directed at some portion of the array 15. In one embodiment the array of sensors 15 covers an entire hemisphere concentric with the ball 11 and two pairs of diametrically opposed source points 10 are placed on one great circle of the ball 11. It is possible to decrease the amount of area required to be covered with sensors by increasing the number of source points 10 used. Uneven spacing between source points 10, or simultaneous use of more than one type of source may be used to cut down or eliminate the symmetries of the ball 11. This would have the effect of simplifying or eliminating the LINK phase of the interpretation algorithm described below. For example different colored lights could be used as sources with color sensitive sensors. Magnets oriented disparately could be used as well, in conjunction with Hall effect sensors of the appropriate polarity. The spacing of the sensors within the sensor arrays must be sufficiently fine so that any source point 10 directed toward an array must be detectable, that is it must activate some sensor in the array. The interface circuitry 30 may be very simple. For example, if an array of discrete cadmium sulfide photoresistors is used (in conjunction with light sources within the ball 11), each photoresistor may be placed in series with a resistor with the point between resistor and photoresistor wired to the input of a TTL buffer. In the embodiment which is here being explained, the resistors should be chosen so that their resistance is sufficiently small compared to the dark resistance of a photoresistor so that the point between a resistor and a photoresistor attains a TTL high whenever no source point is directed toward that photoresistor, but sufficiently large compared to the light resistance of the photoresistor so that the point between a resistor and a photoresistor attains a TTL low whenever a source point is directed toward that photoresistor. The interpretation algorithm (described below), most notably the CENTERS stage, provides tolerance for inconsistent readings of sensors which are receiving a signal strength from a source which is very close to the threshold value. (This circumstance arises when the deviation from alignment between a source point and sensor reaches a critical angle.) Of course, preferable setups using magnets and Hall effect sensors, or other source/sensor pairs may be readily constructed by one skilled in the art. A simple addressing scheme using decoders and a hierarchy of buffers can be used to enable the computer to read the states of the sensors. The decoder inputs may be connected to parallel port outputs, and top level buffer outputs to parallel port inputs. Software may execute a rapid sequence of parallel port write, read pairs to determine the state of all sensors nearly simultaneously. A serial port or other means of communication with a general purpose digital computer may also be used.

Interpretation Algorithm

Figure 2:
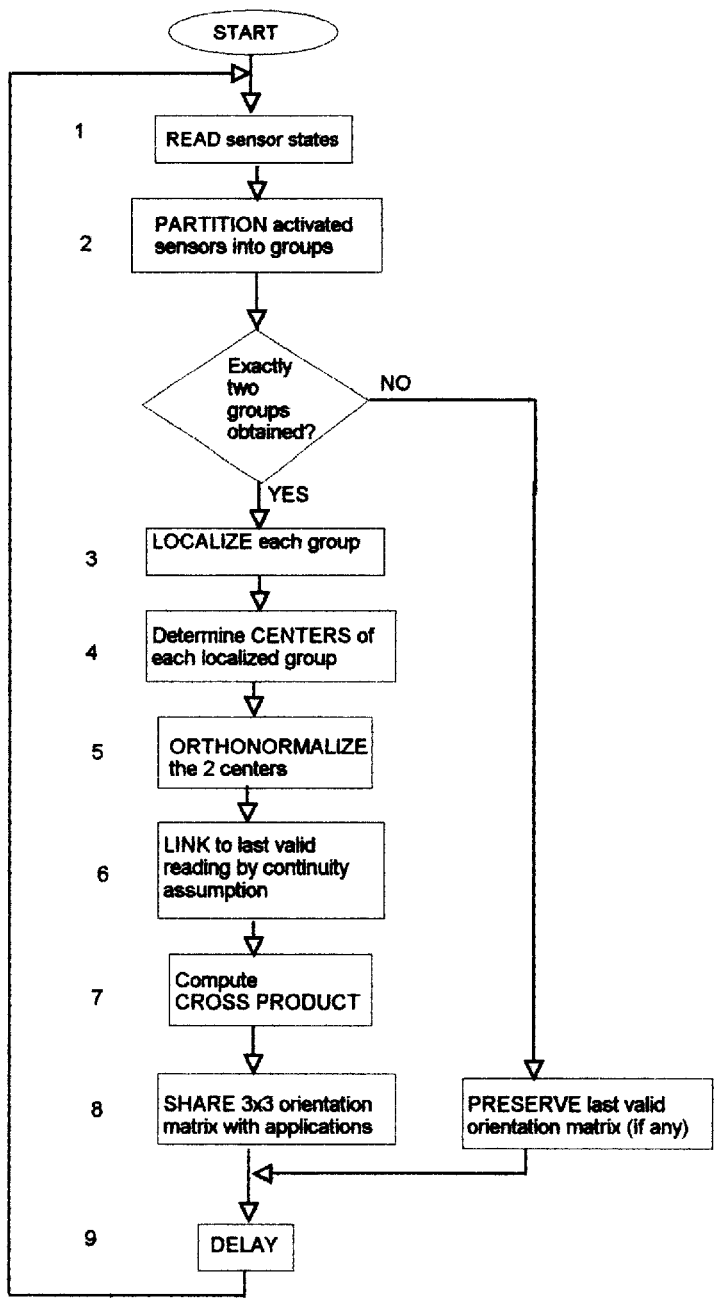
FIG. 2. Flowchart 1. A description of the interpretation algorithm for one embodiment.
Figure 3:
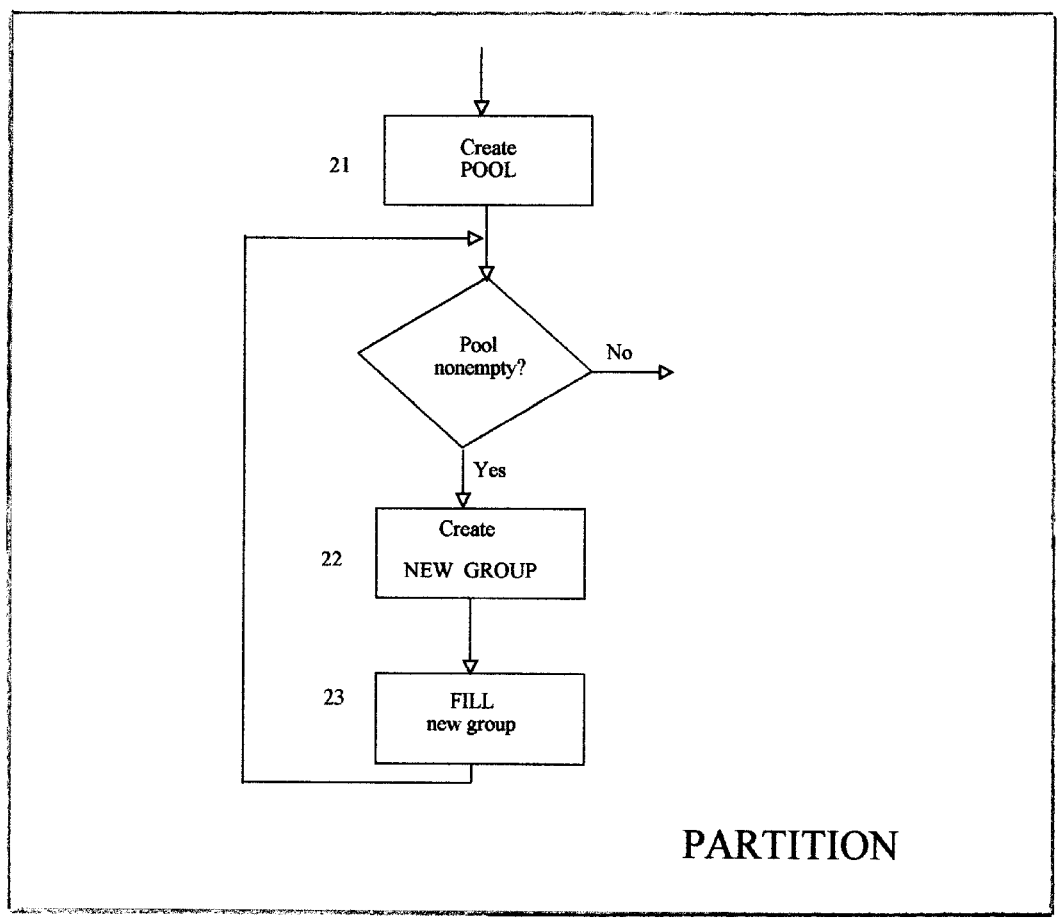
FIG. 3. Flowchart 2. An expanded description of the PARTITION stage of the interpretation algorithm presented in Flowchart 1.

Flowchart 1 (FIG. 2) describes a simple algorithm which may be used to transform the raw information read from the device into a form readily usable by applications software. Flowchart 2 (FIG. 3) adds detail to the PARTITION stage of the algorithm. The algorithm description in the text below (and in the flowcharts) focuses on the simple incarnation of the basic design idea which places four sources equally spaced around a great circle of the ball 11, and provides a full hemisphere of sensors 15. Adaptation to other implementations is relatively straightforward. In the algorithm description, references to sensors and sensor manipulations refer more properly to records of sensor positions and manipulations thereof. The numbered items below correspond to the numbers in Flowcharts 1 and 2 (FIG. 2 and FIG. 3).

(1) Raw information is read from the device as described in the hardware description above.

(2) The objective of this step is to separate the currently activated sensors into two groups. Each group should correspond to an antipodal pair of sources, which in turn corresponds to a special axis through the center of the ball 11. This stage of the algorithm is further elucidated by Flowchart 2 (FIG. 3).

(21) Put all of the activated sensors into a pool.

(22) Remove a sensor from the pool and place it into a new group.

(23) Compute the RP2 distance from each sensor in the pool to each sensor in the new group. If any pool sensor is within $\alpha$ units of a new group sensor, remove that sensor from the pool and insert it into the new group. The RP2 distance between two positions on a sphere is the minimum of the following two quantities: the simple distance between the two positions, and the simple distance between the first position and the antipode of the second position. The simple distance between two positions may be computed with the ordinary Euclidean distance formula, or, to save processing time, with the taxicab metric or any convenient metric. The parameter a is chosen to be greater than the distance between adjacent sensors, but less than the minimum possible distance between sensors which can be simultaneously activated by different sources.

Note that rotation of the ball 11 which directs one source point out of the array of sensors (and thus directs the antipodal source point into the array) is tracked seamlessly. The key to the simple handling of this tracking is the RP2 distance measurements described above.

(3) If one source from an antipodal pair is directed entirely outside the sensor array, then all sensors activated by that antipodal pair are, in fact, activated by a single source, and are thus all close to each other, i.e., the group is already "localized." Furthermore, the center of such a group of activated sensors will determine (approximately) a unit vector lying along the axis of the corresponding pair of antipodal sources. It is also possible for an antipodal pair of sources to be sufficiently close to the rim of the sensor array, so that both sources in the pair are simultaneously activating sensors. In this case, the group of sensors activated by the antipodal pair (as determined by the PARTITION stage of the algorithm) will itself consist of two subgroups corresponding to the two sources in the antipodal pair. Localization of such a group is performed as follows. Each sensor in one of the subgroups is left as is. Each sensor in the other subgroup is replaced by a "virtual" sensor at the position antipodal to its own position. The resulting "localized" group of sensors will have a center which determines (approximately) a unit vector lying along the axis of the corresponding pair of antipodal sources.

(4) The center of a localized group is determined by averaging the coordinates of the positions of the sensors in the localized group.

(5) This step serves to ameliorate errors of measurement and to insure that the algorithm produces a matrix which is orthogonal (to a tolerable approximation) regardless of interference to the device, or abnormal operation of the device for any reason. The two positions computed in the previous stage of the algorithm may be considered as the endpoints of vectors emanating from the center of the ball 11. The lengths of these vectors should be close to the radius of the hemisphere containing the sensors, and the angle between them should be close to 90 degrees (to within the accuracy of measurement of the device). ORTHONORMALIZE replaces these vectors (hereafter called measured vectors) with a pair of nearby vectors (hereafter called computed vectors) whose lengths equal the radius of the hemisphere of sensors, and whose angular separation is 90 degrees to within the accuracy of machine arithmetic. Preferably the computed vectors are determined so as to satisfy the following two requirements. (i) The computed vectors should lie in the plane determined by the measured vectors. (ii) The line which bisects the angle distended by the computed vectors should be the same as the line which bisects the angle distended by the measured vectors. Thus, the effect of ORTHONORMALIZE is to dilate the measured vectors to the appropriate length, and spread or close them to 90 degrees without leaving their original plane.

(6) The last valid orientation matrix produced by the algorithm consists of three column vectors, $a_1$, $a_2$, and $a_1 \times a_2$, where $a_1$ points along (the position at the time of the last valid device reading of) the axis of one pair of antipodal sources, and $a_2$ points along (the position at the time of the last valid device reading of) the axis of the other pair of antipodal sources. Call the two computed vectors of ORTHONORMALIZE $t_1$ and $t_2$. If the delay between consecutive device readings has been set to be sufficiently small, so that the ball 11 does not get rotated through a large angle between consecutive readings, the ordered pair $(a_1, a_2)$ will be close to exactly one of the following eight ordered pairs of vectors: $(t_1, t_2)$, $(t_1, -t_2)$, $(-t_1, t_2)$, $(-t_1, -t_2)$, $(t_2, t_1)$, $(t_2, -t_1)$, $(-t_2, t_1)$ and $(-t_2, -t_1)$. The new values of $a_1$ and $a_2$ will be, respectively, the first and second vectors from the ordered pair in the list above which is closest to the previous value of $(a_1, a_2)$. Note that on the occasion of the first valid device reading, $(a_1, a_2)$ may be chosen from the list of eight possibilities according to an arbitrary convention. This has the consequence that, on startup, an arbitrarily determined association is established between $a_1$ and one of the four sources, and between $a_2$ and one of the two sources perpendicular to the source associated with $a_1$. LINK maintains the consistency of this association throughout a session.

(7) Compute the vector cross product $a_1 \times a_2$ of the vectors $a_1$ and $a_2$ as newly computed by LINK. The 3×3 matrix with columns $a_1$, $a_2$ and $a_1 \times a_2$ describes the current orientation of ball 11.

(8) The 3×3 orientation matrix describing the current orientation of the ball 11 could, for instance, be copied to a shared memory area.

(9) The length of the delay before the next device reading needs to be sufficiently large so that this algorithm does use an excessively large percentage of the processor's time, yet sufficiently small so that only small rotations of the ball 11 can take place between consecutive device readings. Alternatively, the device could be implemented using processor interrupts rather than polling.

I claim:

1. A computer input device comprising:

(a) a ball with a plurality of directed sources inside arranged so that at least two axes of the ball are distinguished, (b) a bearing on which said ball rests so said ball may be rotated easily in an arbitrary fashion around any axis through the center of said ball, (c) a base which holds said bearing as well as a plurality of sensors capable of responding to said directed sources inside said ball, (d) an enclosure to isolate said sensors from the environment outside said device and keep said ball easily accessible for free rotation, and (e) interface circuitry to allow a device selected from the group consisting of general purpose computers and specialized electronic processors to read the state of each sensor from the said plurality of sensors, whereby said device will provide three dimensional rotational control of a graphical object displayed on a monitor, whereby there is a natural correlation between the movement of said ball by the hand of the user and the three dimensional rotational control of a graphical object, and whereby said natural correlation is established by absolute measurements of orientation.

2. The computer input device of claim 1 wherein said directed sources are light sources and said sensors are photosensitive devices.

3. The computer input device of claim 1 wherein said directed sources are magnets and said sensors respond to magnet fields.

4. The computer input device of claim 1 wherein said directed sources are colored lights and said sensors are color sensitive sensors.

5. A method of manipulating a three dimensional graphical object comprising:

(a) providing a device containing a ball with directed sources inside arranged so that at least two axes of the ball are distinguished, (b) providing a bearing on which said ball rests so said ball may be rotated easily in an arbitrary fashion around any axis through the center of said ball, (c) providing a base which holds said bearing as well as a plurality of sensors capable of responding to said directed sources inside said ball, (d) providing an enclosure to isolate said sensors from the environment outside said device and keep said ball easily accessible for free rotation, and (e) providing interface circuitry to allow a device selected from the group consisting of general purpose computers and specialized electronic processors to read the state of each sensor from said plurality of sensors, whereby said method will provide three dimensional rotational control of a graphical object displayed on a monitor, whereby there is a natural correlation between the movement of said ball by the hand of the user and said three dimensional rotational control of a graphical object, and whereby said natural correlation is established by absolute measurements of orientation.

6. A process yielding absolute measurements of orientation from a computer input device containing a freely manipulable ball with directed sources arranged so that at least two axes through the center of said ball are distinguished comprising the steps of:

(a) taking a single initial device reading comprising:
  (1) reading raw information from said computer input device,
  (2) separating activated sensors of said computer input device into two groups,
  (3) mapping the groups of sensors into localized groups of virtual sensors,
  (4) averaging the coordinates of the positions of said virtual sensors in said localized groups to obtain current positions of at least two distinguished axes,
  (5) normalizing computed data describing the current axis positions,
  (6) making a conventional choice of orientation from a group of symmetric possibilities consistent with the computed axis positions, and
  (7) storing a mathematical description of said choice of orientation in memory, and (b) taking subsequent periodic device readings consisting of (1) through (5) as above and then making a choice of orientation consistent with the previous computed orientation thereby discarding symmetric possibilities compatible with the current device reading and then storing a mathematical description of said choice of orientation in memory, whereby there is a periodically updated 3×3 orientation matrix to allow applications programs to present a graphical object in the same orientation as the orientation that the user has given to the ball in said computer input device, and whereby said 3×3 orientation matrix is determined by absolute measurements of orientation.

* * * * *